(12) United States Patent
Chang et al.

(10) Patent No.: US 11,945,032 B2
(45) Date of Patent: Apr. 2, 2024

(54) FORGING HEADS AND FIXING DEVICES WITH ALIGNED THROUGH-HOLES AND CAVITIES

(71) Applicant: General Electric Company, Schenectady, NY (US)

(72) Inventors: Hai Chang, Shanghai (CN); Dalong Zhong, Shanghai (CN); Yingna Wu, Shanghai (CN); Yong Wu, Shanghai (CN); Zirong Zhai, Shanghai (CN); Yifeng Wang, Shanghai (CN)

(73) Assignee: General Electric Company, Schenectady, NY (US)

(*) Notice: Subject to any disclaimer, the term of this patent is extended or adjusted under 35 U.S.C. 154(b) by 1179 days.

(21) Appl. No.: 16/229,228

(22) Filed: Dec. 21, 2018

(65) Prior Publication Data

US 2019/0201981 A1 Jul. 4, 2019

(30) Foreign Application Priority Data

Jan. 2, 2018 (CN) .......................... 201810001883.6

(51) Int. Cl.
*C22C 29/08* (2006.01)
*B21J 1/06* (2006.01)
(Continued)

(52) U.S. Cl.
CPC .................................... *B22F 3/17* (2013.01);
*B21J 1/06* (2013.01); *B21J 5/002* (2013.01);
*B21J 7/02* (2013.01); *B21J 9/02* (2013.01);
*B21J 9/18* (2013.01); *B21J 13/02* (2013.01);
*B21J 13/06* (2013.01);

*B22F 3/24* (2013.01); *B22F 10/25* (2021.01);
*B22F 10/50* (2021.01); *B22F 12/20* (2021.01);
(Continued)

(58) Field of Classification Search
None
See application file for complete search history.

(56) References Cited

U.S. PATENT DOCUMENTS 4,051,590 A 10/1977 Halter et al.
6,172,327 B1 * 1/2001 Aleshin .................. B23P 6/007
219/121.84

(Continued)

FOREIGN PATENT DOCUMENTS

CN 104625656 A 5/2015
CN 105087854 A * 11/2015
(Continued)

OTHER PUBLICATIONS

CN 107287588 A translation (Year: 2023).*
(Continued)

*Primary Examiner* — Francisco W Tschen
*Assistant Examiner* — Guy F Mongelli
(74) *Attorney, Agent, or Firm* — Dority & Manning, P.A.

(57) ABSTRACT

A forging head for additive manufacturing, comprising a base portion and a forging portion. The forging portion extends from the base portion for forging a cladding layer during formation of the cladding layer by additive manufacturing. The forging head further comprising a through hole which is formed through the base portion and the forging portion, for at least one of an energy bean and an additive material to pass through during formation of the cladding layer.

20 Claims, 14 Drawing Sheets

(51) Int. Cl.

| | |
|---|---|
| *B21J 5/00* | (2006.01) |
| *B21J 7/02* | (2006.01) |
| *B21J 9/02* | (2006.01) |
| *B21J 9/18* | (2006.01) |
| *B21J 13/02* | (2006.01) |
| *B21J 13/06* | (2006.01) |
| *B22F 3/17* | (2006.01) |
| *B22F 3/24* | (2006.01) |
| *B22F 10/25* | (2021.01) |
| *B22F 10/38* | (2021.01) |
| *B22F 10/50* | (2021.01) |
| *B22F 12/20* | (2021.01) |
| *B22F 12/82* | (2021.01) |
| *B23K 9/04* | (2006.01) |
| *B23K 15/00* | (2006.01) |
| *B23K 26/00* | (2014.01) |
| *B23K 26/342* | (2014.01) |
| *B33Y 10/00* | (2015.01) |
| *B33Y 30/00* | (2015.01) |
| *B33Y 40/00* | (2020.01) |
| *B33Y 70/00* | (2020.01) |
| *C22C 19/03* | (2006.01) |
| *C22C 19/05* | (2006.01) |

(52) U.S. Cl.
CPC .............. *B22F 12/82* (2021.01); *B23K 9/04* (2013.01); *B23K 15/0086* (2013.01); *B23K 26/0093* (2013.01); *B23K 26/342* (2015.10); *B33Y 30/00* (2014.12); *B33Y 40/00* (2014.12); *B22F 10/38* (2021.01); *B22F 2999/00* (2013.01); *B33Y 10/00* (2014.12); *B33Y 70/00* (2014.12); *C22C 19/03* (2013.01); *C22C 19/051* (2013.01); *C22C 29/08* (2013.01)

(56) References Cited

U.S. PATENT DOCUMENTS

| | | | | |
|---|---|---|---|---|
| 9,302,338 | B2 | 4/2016 | Zhang et al. | |
| 2006/0247350 | A1* | 11/2006 | Ellison | B22F 3/1035 524/297 |
| 2008/0169081 | A1* | 7/2008 | Frasier | C30B 11/14 164/258 |
| 2008/0225464 | A1* | 9/2008 | Lashmore | H01G 11/22 423/447.2 |
| 2010/0044115 | A1* | 2/2010 | Mirchandani | E21B 10/42 419/15 |
| 2011/0052443 | A1* | 3/2011 | Hanlon | C22F 1/10 148/555 |
| 2012/0138770 | A1 | 6/2012 | Luo et al. | |
| 2012/0295075 | A1* | 11/2012 | Yasukochi | B29C 64/321 425/174 |
| 2014/0299091 | A1 | 10/2014 | Ribeiro et al. | |
| 2015/0064047 | A1* | 3/2015 | Hyde | B22F 10/38 164/113 |
| 2015/0093279 | A1 | 4/2015 | Kington et al. | |
| 2016/0361869 | A1* | 12/2016 | Mark | B33Y 50/02 |
| 2017/0057011 | A1 | 3/2017 | Hyatt et al. | |
| 2017/0232674 | A1* | 8/2017 | Mark | B29C 31/042 264/308 |
| 2017/0274454 | A1* | 9/2017 | Feng | B22F 12/70 |
| 2019/0047088 | A1* | 2/2019 | Riemann | B22F 12/53 |
| 2021/0245430 | A1* | 8/2021 | Burt | B29C 31/045 |

FOREIGN PATENT DOCUMENTS

| | | | |
|---|---|---|---|
| CN | 105268973 | A | 1/2016 |
| CN | 103962560 | B | 5/2016 |
| CN | 104313600 | B | 8/2016 |
| CN | 106216685 | A | 12/2016 |
| CN | 106825348 | A | 6/2017 |
| CN | 106825574 | A | 6/2017 |
| CN | 206343579 | U | 7/2017 |
| CN | 105088225 | B | 8/2017 |
| CN | 107287588 | A | 10/2017 |
| CN | 107287588 | A * | 10/2017 |
| CN | 107335805 | A | 11/2017 |
| DE | 19525983 | A1 | 2/1996 |
| JP | H06158144 | A | 6/1994 |
| JP | 2001071086 | A | 3/2001 |
| WO | 2016063224 | A1 | 4/2016 |

OTHER PUBLICATIONS

CN-105087854-A (Year: 2023).*
Rajiv Shivpuri, "Dies and Die Materials for Hot Forging" in "Metalworking: Bulk Forming", Jan. 1, 2005, ASM International, pp. 47-61 (Abstract Only).
Jiang et al., "An integrated method for net-shape manufacturing components combining 3D additive manufacturing and compressive forming processes", Procedia Engineering, vol. 207, pp. 1182-1187, 2017.
Sizova et al., "Hot workability and microstructure evolution of pre-forms for forgings produced by additive manufacturing", Procedia Engineering, vol. 207, pp. 1170-1175, 2017.

* cited by examiner

FORGING HEADS AND FIXING DEVICES WITH ALIGNED THROUGH-HOLES AND CAVITIES

TECHNICAL FIELD

The present invention relates to a forging head and a forging device, and more particularly a forging head and a forging device suitable for additive manufacturing, and an additive manufacturing system using the forging head and the forging device.

BACKGROUND OF THE DISCLOSURE

Additive manufacturing technology is a rapidly evolving emerging technology for material processing. At present, the mainstream additive manufacturing usually achieves metallurgical bonding of metal materials through the "melting-solidification" method, which is characterized by using a high-energy beam such as a laser beam, an electron beam or an arc beam as a heat source to melt the synchronously fed metal material, such as metal powder, metal wire, and so on, which are stacked in layers, whereby parts are manufactured by surfacing, and the internal microstructure of the obtained parts is a solidified structure.

Compared with the conventional forged structure, the solidified structure obtained by the above-mentioned "melting-solidification" method produces crystals that are very coarse with obvious directionality, therefore in a general sense, it is difficult to achieve comprehensive performance comparable to that of a forged material. In order to improve the mechanical properties of the obtained parts and reduce internal defects, a method of combining the molten deposition additive with thermomechanical processing has been gradually developed, that is, material deposition and metallurgical bonding are achieved by melting-solidification, thereafter rolling, shock processing and other treatments are used to refine the grains and improve internal quality.

Although the method of melting combined with forging can improve the internal quality as well as enhance performance to some extent, in this composite machining method, it is generally carried out under high temperature processing conditions. Thus, the forging head of the forging device (for example, the impacting member) needs to be forged under very high temperature and stress, which easily causes damage or scrapping of the forging head, affecting the efficiency of the entire additive manufacturing combined with the forging composite machining process.

Therefore, it is necessary to provide a novel forging head and forging device which can be applied to an additive manufacturing system and which can solve at least one of the above-mentioned technical problems.

BRIEF DESCRIPTION OF THE DISCLOSURE

A forging head for additive manufacturing, comprising: a base portion and a forging portion. The forging portion extends from the base portion for forging a cladding layer during formation of the cladding layer by additive manufacturing; the forging head further comprising a through hole which is formed through the base portion and the forging portion, for at least one of an energy bean and an additive material to pass through during formation of the cladding layer.

A forging device for additive manufacturing, comprising: a forging head and a forging head fixing device. The forging head comprises a base portion, a forging portion extending from the base portion, and a through hole formed through the base portion and the forging portion. The forging portion is configured for forging a cladding layer during formation of the cladding layer by additive manufacturing. The forging head fixing device comprising a cavity, for receiving the forging head. The through hole and the cavity communicate with each other, and are configured to allow at least one of an energy beam and an additive material to pass through during formation of the cladding layer.

An additive manufacturing system, comprising: an energy source and a forging device. The energy source is configured to provide an energy beam, for fusing at least a portion of a material added to a surface of the substrate for forming a cladding layer on the substrate or heating the cladding layer. The forging device comprises a forging head, for forging the cladding layer during formation of the cladding layer by additive manufacturing. The forging head comprises a base portion, a forging portion and a through hole formed through the base portion and the forging portion. The through hole is configured to allow at least one of an energy beam and an additive material to pass through during formation of the cladding layer.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where.

DETAILED DESCRIPTION

Unless otherwise defined, technical terms or scientific terms used in this specification and claims are to be understood as the ordinary meaning of the ordinary skill in the art. "First", "second", and similar words used herein do not denote any order, quantity, or importance, but are merely intended to distinguish between different constituents. The terms "one", "a" and similar words are not meant to be limiting, but rather denote the presence of at least one. The approximate language used herein can be used for quantitative expressions, indicating that there is a certain amount of variation that can be allowed without changing the basic functions. Thus, numerical values that are corrected by language such as "approximately" or "about" are not limited to the exact value itself. Similarly, the terms "one", "a", and similar words are not meant to be limiting, but rather denote the presence of at least one. "Comprising", "consisting", and similar words mean that elements or articles appearing before "comprising" or "consisting" include the elements or articles and their equivalent elements appearing behind "comprising" or "consisting", not excluding any other elements or articles. "Connected", "connection", "coupled", and similar words are not limited to a physical or mechanical connection, but may include direct or indirect electrical connections, thermal connections, thermally conductive connections, and thermally transmissive connections.

The present invention relates to a forging head and forging device for additive manufacturing, and an additive manufacturing system using the forging head and forging device.

Figure 1:
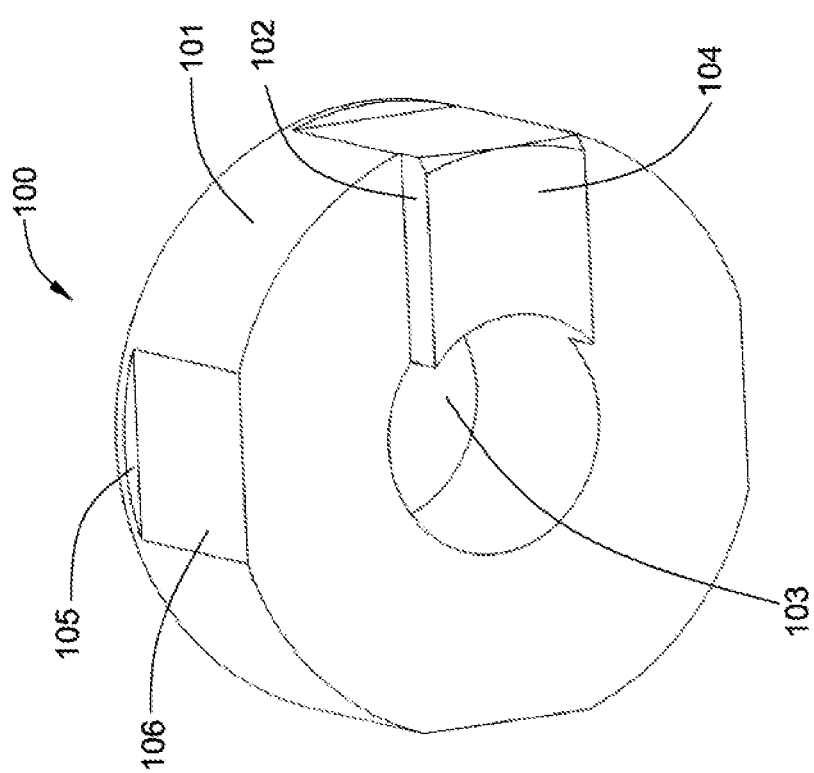
FIG. 1 is a perspective view of a forging head according to an embodiment of the present invention.

FIG. 1 shows a schematic view of a forging head 100 according to an embodiment of the present invention. The forging head 100 can be configured for additive manufacturing in combination with forging composite processes. The forging head 100 comprises a cylindrical base portion 101 and a forging portion 102 at the bottom of the base portion 101. The forging portion 102 extends from the bottom of the base portion 101 for forging a cladding layer during formation of the cladding layer by additive manufacturing. The forging head 100 further comprises a through hole 103 formed through the base portion 101 and the forging portion 102. The through hole 103 has a straight cylindrical shape, and is configured to allow at least one of an energy beam and an additive material of the additive manufacturing system to pass through during formation of the cladding layer.

The forging portion 102 comprises a substantially flat forging surface 104 for contacting the cladding layer. The forging portion 102 is located on one side of the through hole 103. The forging head 100 also forms a plurality of grooves 106 on the base portion 101 by cutting a portion of the cylindrical base portion 101 in a direction toward the top end of the base portion 101 to form a plurality of step portions 105 adjacent to a top end thereof. The step portion 105 can be fixed to the forging head fixing device by mating with the fastener.

The forging head 100 can move along the trajectory of the additive manufacturing system to form the cladding layer. The forging portion 102 can forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures. In the present embodiment, the forging surface 104 of the forging portion 102 of the forging head 100 is flat, which can increase the contact area with the cladding layer and improve the forging efficiency of the forging head 100.

Figure 2:
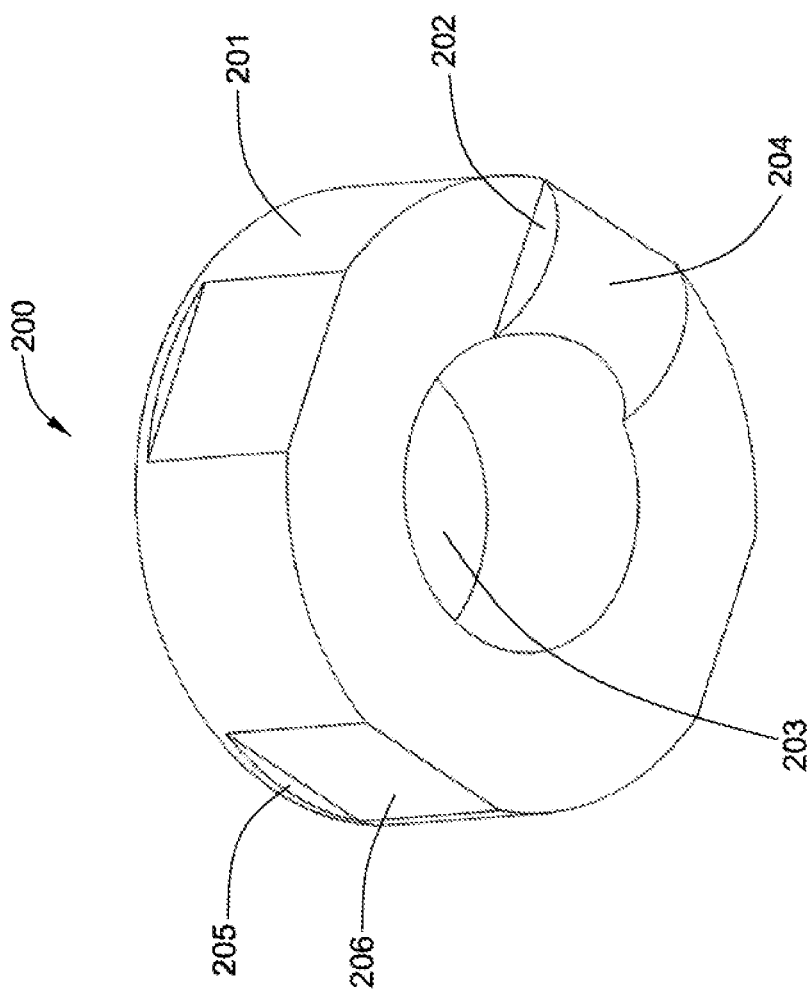
FIG. 2 is a perspective view of a forging head according to an embodiment of the present invention.

FIG. 2 shows a schematic view of a forging head 200 according to an embodiment of the present invention. The forging head 200 can be configured for additive manufacturing in combination with forging composite processes. The forging head 200 shown in FIG. 2 is substantially identical in construction to the forging head 100 of the embodiment shown in FIG. 1, which also comprises a cylindrical base portion 201 and a forging portion 202 at the bottom of the base portion 201. The forging portion 202 extends from the bottom of the base portion 201 for forging a cladding layer during formation of the cladding layer by additive manufacturing. The forging head 200 also comprises a through hole 203 formed through the base portion 201 and the forging portion 202. The through hole 203 has a straight cylindrical shape, and is configured to allow at least one of an energy beam and an additive material of the additive manufacturing system to pass through during formation of the cladding layer.

The forging portion 202 comprises a substantially flat forging surface 204 for contacting the cladding layer. The forging portion 202 is also located on one side of the through hole 203. The forging head 200 also forms a plurality of grooves 206 on the base portion 201 by cutting a portion of the cylindrical base portion 201 in a direction toward the top end of the base portion 201 to form a plurality of step portions 205 adjacent to a top end thereof. The step portion 205 can be fixed to the forging head fixing device by mating with the fastener.

The forging head 200 is substantially identical in construction to the forging head 100 of the embodiment of FIG. 1, which can move along the trajectory of the additive manufacturing system to form the cladding layer. The forging portion 202 can also forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures. In the present embodiment, the main difference between the forging head 200 and the forging head 100 shown in the embodiment of FIG. 1 is that the forging surface 204 of the forging portion 202 of the forging head 200 is curved, which can increase the forged cladding layer; the stress in contact with the cladding layer is mainly applied to materials with high yield strength.

Figure 3:
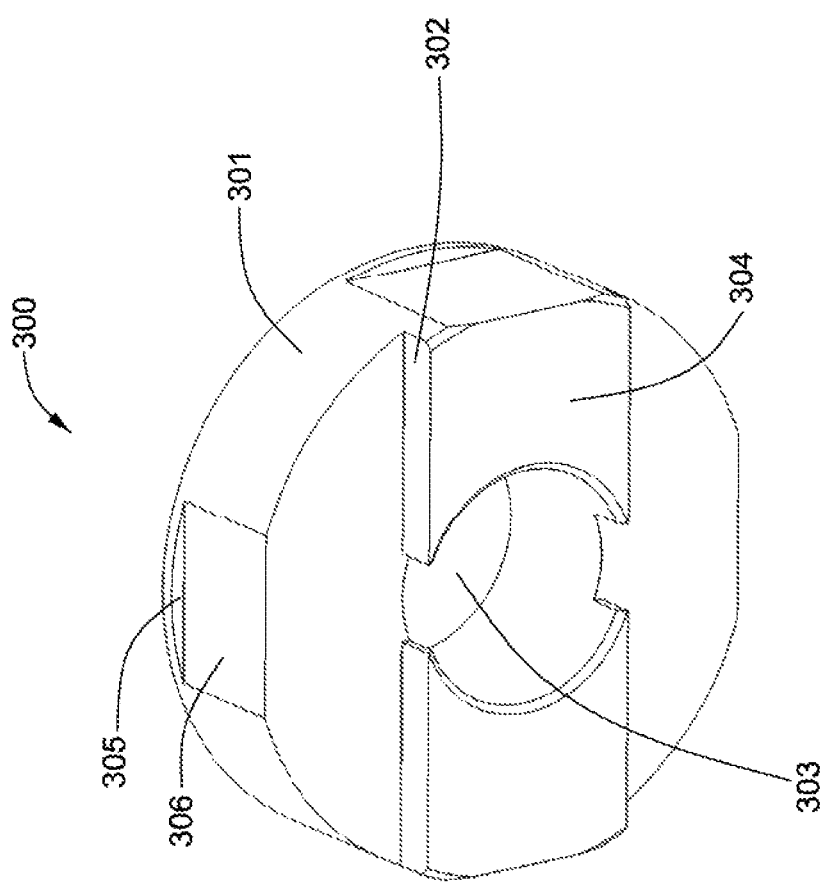
FIG. 3 is a perspective view of a forging head according to an embodiment of the present invention.

FIG. 3 shows a schematic view of a forging head 300 according to an embodiment of the present invention. The forging head 300 can also be used in additive manufacturing in combination with forging composite processes. The forging head 300 shown in FIG. 3 is substantially identical to the forging head construction of the embodiment shown in FIGS. 1 and 2, and also comprises a cylindrical base portion 301 and a forging portion 302 at the bottom of the base portion 301. The forging portion 302 extends from the bottom of the base portion 301 for forging a cladding layer during formation of the cladding layer by additive manufacturing. The forging head 300 also comprises a through hole 303 formed through the base portion 301 and the forging portion 302. The through hole 303 has a straight cylindrical shape, and is configured to allow at least one of an energy beam and an additive material of the additive manufacturing system to pass through during formation of the cladding layer.

The forging portion 302 comprises a substantially flat forging surface 304 for contacting the cladding layer. The forging head 300 also forms a plurality of grooves 306 on the base portion 301 by cutting a portion of the cylindrical base portion 301 in a direction toward the top end of the base portion 301 to form a plurality of step portions 305 adjacent to a top end thereof. The step portion 305 can also be fixed to the forging head fixing device by mating with the fastener.

The forging head 300 is substantially identical in structure to the forging head of the embodiments of FIG. 1 and FIG. 2, which can move along the trajectory of the additive manufacturing system to form the cladding layer. The forging portion 302 can also forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures.

In the embodiment shown in FIG. 3, the main difference between the forging head 300 and the forging head 100 shown in the embodiment of FIG. 1 is that the forging portion 302 of the forging head 300 is symmetrically disposed on both sides of the through hole 303. Thereby, the forging head 300 can forge the cladding layer in real time during the reciprocating movement along the trajectory of the additive manufacturing system to form the cladding layer, and the forging efficiency of the forging head 300 can be effectively improved.

Figure 4:
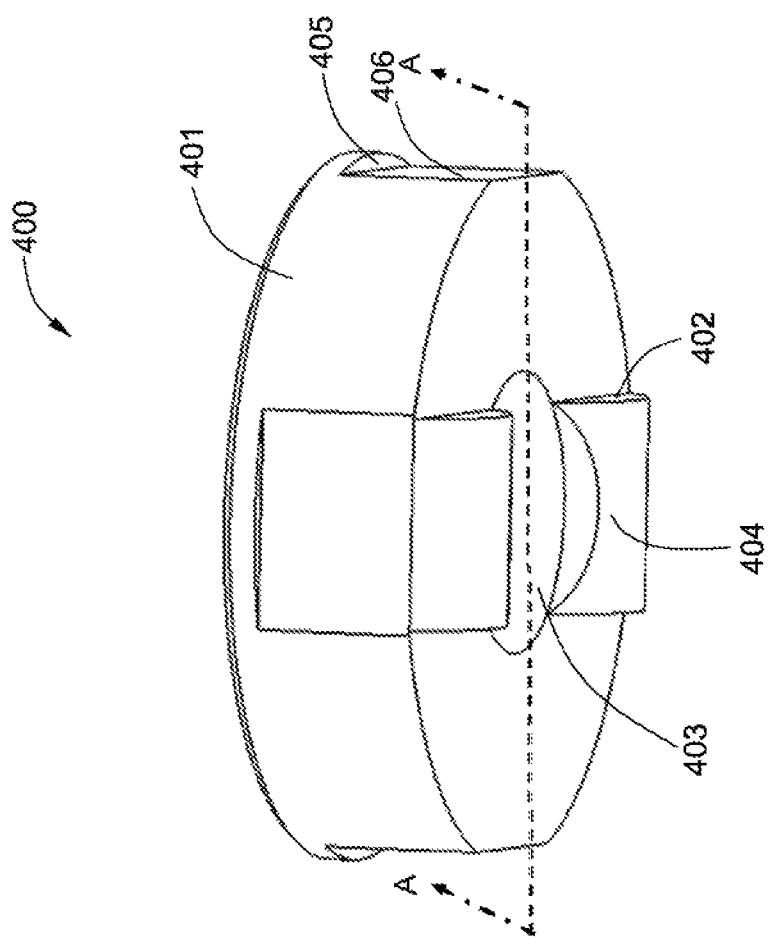
FIG. 4 is a perspective view of a forging head according to an embodiment of the present invention.

FIG. 4 shows a schematic view of a forging head 400 according to an embodiment of the present invention. The forging head 400 can also be used in additive manufacturing in combination with forging composite processes. The forging head 400 shown in FIG. 4 is substantially identical in construction to the forging head of the embodiment shown in FIGS. 1 to 3, which also comprises a cylindrical base portion 401 and a forging portion 402 at the bottom of the base portion 401. The forging portion 402 extends from the bottom of the base portion 401 for forging a cladding layer during formation of the cladding layer by additive manufacturing. The forging head 400 also comprises a through hole 403 formed through the base portion 401 and the forging portion 402. The through hole 403 is configured to allow at least one of an energy beam and an additive material of the additive manufacturing system to pass through during formation of the cladding layer.

The forging portion 402 comprises a substantially flat forging surface 404 for contacting the cladding layer. The forging head 400 also forms a plurality of grooves 406 on the base portion 401 by cutting a portion of the cylindrical base portion 401 in a direction toward the top end of the base portion 401 to form a plurality of step portions 405 adjacent to a top end thereof. The step portion 405 is also capable of fixing the forging head 400 to the forging head fixing device by mating with the fastener.

The forging head 400 is substantially identical in construction to the forging head of the embodiment shown in FIGS. 1-3, which can move along the trajectory of the additive manufacturing system to form the cladding layer. The forging portion 402 can also forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures.

Figure 5:
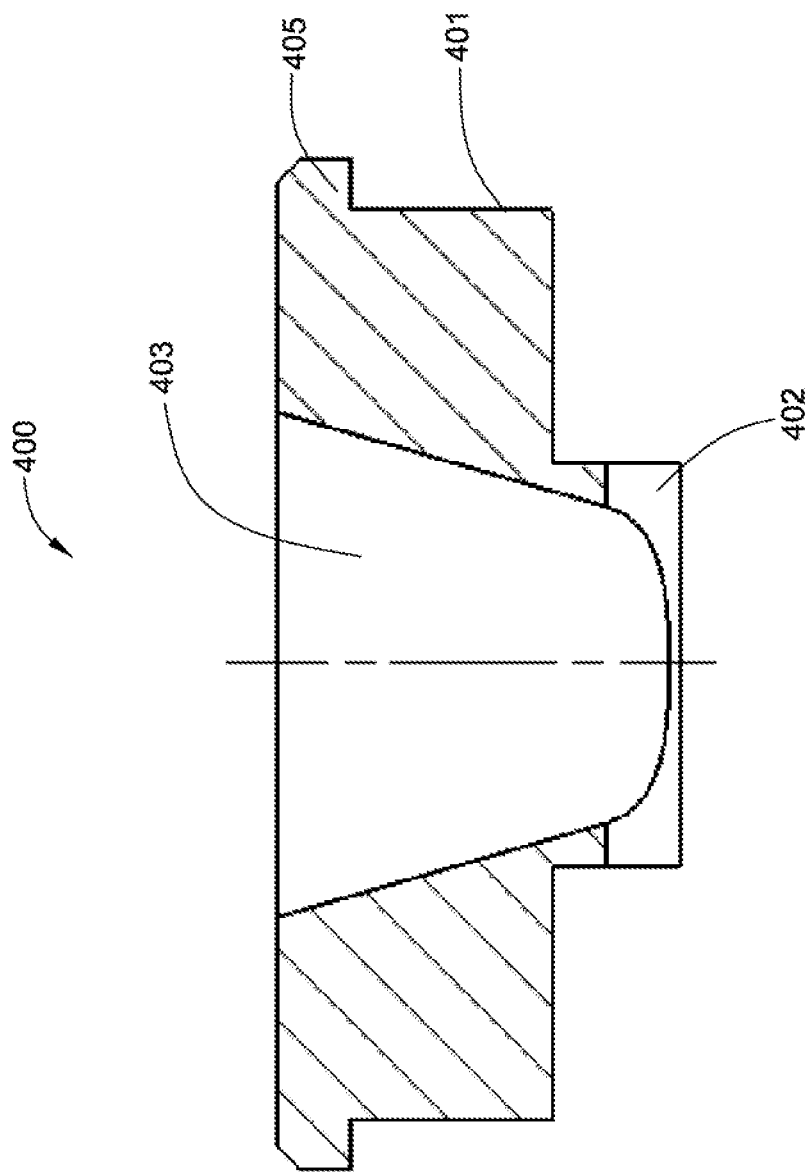
FIG. 5 is a cross-sectional view of the forging head of FIG. 4 taken along line A-A.

In the embodiment shown in FIG. 4, the main difference between the forging head 400 and the forging head 100 shown in the embodiment of FIG. 1 is that the forging portion 402 of the forging head 400 is symmetrically disposed on both sides of the through hole 403, while the forging surface 404 of the forging portion 402 configured to come into contact with the cladding layer is curved. Thereby, the forging head 400 can forge the cladding layer in real time during the reciprocating movement along the trajectory of the additive manufacturing system to form the cladding layer, and the forging efficiency of the forging head 400 can be effectively improved; at the same time, the curved forging surface 404 can increase the stress in contact with the cladding layer when the forging head forges the cladding layer, which is mainly suitable for materials with high yield strength. In combination with FIG. 5, it shows that the through hole 403 of the forging head 400 has a structure that is larger at the top and smaller at the bottom, with the longitudinal cross section of the through hole 403 having an inverted trapezoidal structure. Thereby, the through hole 403 focuses of the additive material of the additive manufacturing system to avoid interference, while on the other hand, it is advantageous for increasing the forging portion of the forging head 400, such that the forging efficiency of the forging head can be correspondingly improved.

Figure 6:
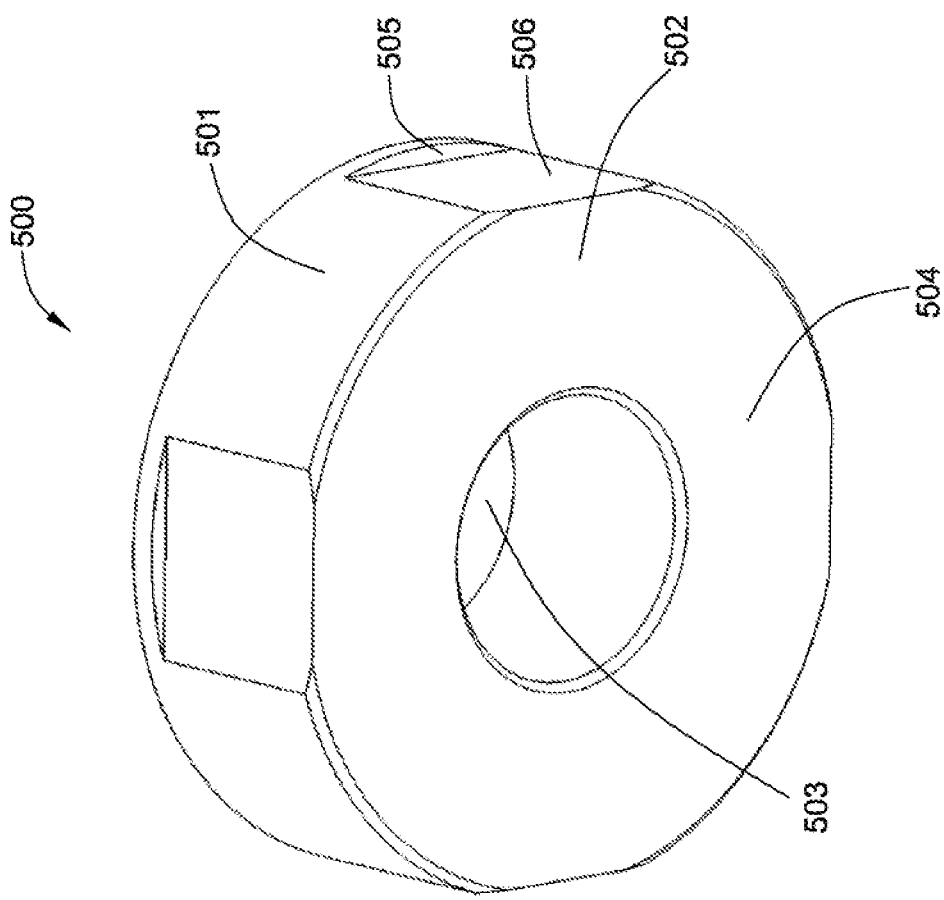
FIG. 6 is a perspective view of a forging head according to an embodiment of the present invention.

FIG. 6 shows a schematic view of a forging head 500 according to an embodiment of the present invention. The forging head 500 can also be used in additive manufacturing in combination with forging composite processes. The forging head 500 shown in FIG. 6 is substantially identical in construction to the forging head of the embodiment shown in FIGS. 1 to 5, which also comprises a cylindrical base portion 501 and a forging portion 502 at the bottom of the base portion 501. The forging portion 502 extends from the bottom of the base portion 501 for forging a cladding layer during formation of the cladding layer by additive manufacturing. The forging head 500 also comprises a through hole 503 formed through the base portion 501 and the forging portion 502. The through hole 503 is configured to allow at least one of an energy beam and an additive material of the additive manufacturing system to pass through during formation of the cladding layer.

The forging portion 502 comprises a substantially flat forging surface 504 for contacting the cladding layer. The forging head 500 also forms a plurality of grooves 506 on the base portion 501 by cutting a portion of the cylindrical base portion 501 in a direction toward the top end of the base portion 501 to form a plurality of step portions 505 adjacent to a top end thereof. The step portion 505 is also capable of fixing the forging head 500 to the forging head fixing device by mating with the fastener.

The forging head 500 is substantially identical in construction to the forging head of the embodiment of FIGS. 1-5, which can move along the trajectory of the additive manufacturing system to form the cladding layer. The forging portion 502 can also forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures.

In the embodiment shown in FIG. 6, the main difference between the forging head 500 and the forging head 100 shown in the embodiment of FIG. 1 is that the forging portion 502 of the forging head 500 is formed by integrally extending from the bottom of the base portion 501 which also surrounds the through hole 503. Moreover, the entire forging surface 504 of the forging portion 502 in contact with the cladding layer is flat. Thereby, the forging head 500 can forge the cladding layer in real time during the reciprocating movement along the trajectory of the additive manufacturing system to form the cladding layer or along the more complicated additive manufacturing cladding path; it can effectively improve the forging efficiency of the forging head 500, while the entire flat forging surface 504 can increase the area of contact with the cladding layer as the forging head is forging the cladding layer, which can also effectively improve the forging efficiency of the forging head.

Figure 7:
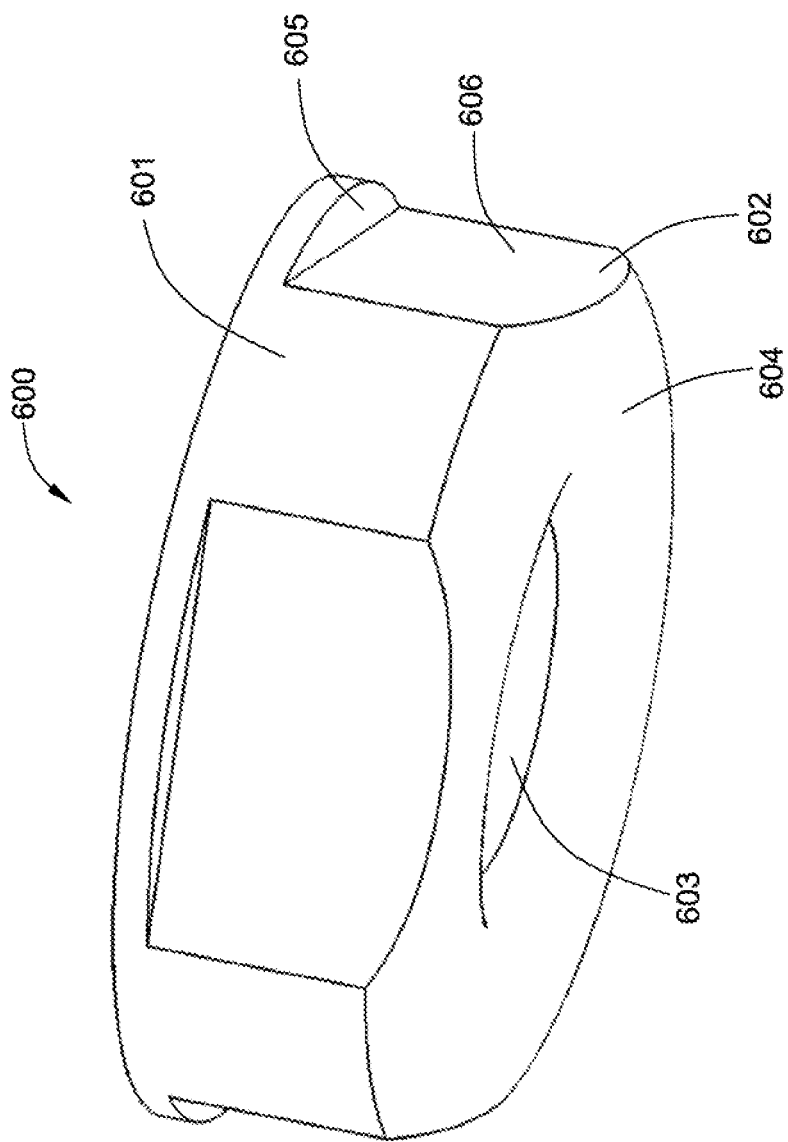
FIG. 7 is a perspective view of a forging head according to an embodiment of the present invention.

FIG. 7 shows a schematic view of a forging head 600 according to an embodiment of the present invention. The forging head 600 can also be used in additive manufacturing in combination with forging composite processes. The forging head 600 shown in FIG. 7 is substantially identical in construction to the forging head of the embodiment shown in FIGS. 1 to 6, which also comprises a cylindrical base portion 601 and a forging portion 602 at the bottom of the base portion 601. The forging portion 602 extends from the bottom of the base portion 601 for forging a cladding layer during formation of the cladding layer by additive manufacturing. The forging head 600 also comprises a through hole 603 formed through the base portion 601 and the forging portion 602. The through hole 603 is configured to allow at least one of an energy beam and an additive material of the additive manufacturing system to pass through during formation of the cladding layer.

The forging portion 602 comprises a substantially flat forging surface 604 for contacting the cladding layer. The forging head 600 also forms a plurality of grooves 606 on the base portion 601 by cutting a portion of the cylindrical base portion 601 in a direction toward the top end of the base portion 601 to form a plurality of step portions 605 adjacent to a top end thereof. The step portion 605 is also capable of fixing the forging head 600 to the forging head fixing device by mating with the fastener.

The forging head 600 is substantially identical in construction to the forging head of the embodiment of FIGS. 1-6, which can move along the trajectory of the additive manufacturing system to form the cladding layer. The forging portion 602 can also forge the cladding layer in real time during the formation of the cladding layer, thereby achieving peening on the cladding layer, and eliminating defects such as holes, slip planes, and micro fractures in the cladding layer, thereby increasing the density of the final formed part. In addition, the microstructure of the final cladding layer can also be altered, such as to promote recrystallization of the cladding layer material and formation of fine equiaxed crystal structures.

In the embodiment shown in FIG. 7, the main difference between the forging head 600 and the forging head 100 shown in the embodiment of FIG. 1 is that the forging portion 602 of the forging head 600 is formed by integrally extending from the bottom of the base portion 601 which also surrounds the through hole 603. Also, the entire forging surface 504 of the forging portion 602 for contact with the cladding layer is curved. Thereby, the forging head 600 can forge the cladding layer in real time during the reciprocating movement along the trajectory of the additive manufacturing system to form the cladding layer or along the more complicated additive manufacturing cladding path; it can effectively improve the forging efficiency of the forging head 600, while the curved forging surface 604 can increase the stress in contact with the cladding layer as the forging head is forging the cladding layer, which is mainly suitable for materials with high yield strength.

The forging head of the present invention is made of an alloy material which mainly comprises an alloy material having a hardness of greater than 30 Rockwell C hardness. In some embodiments, the alloy material comprises a tungsten carbide based cemented carbide. The tungsten carbide based cemented carbide contains cobalt, with a percentage of the cobalt (by weight) less than 30%. In some embodiments, the tungsten carbide based cemented carbide contains cobalt, with a percentage of cobalt (by weight) around 20% to 25%. Thus, the forging head can be guaranteed to have better toughness and hardness. In some embodiments, the alloy material comprises a nickel based alloy which contains tungsten in an amount greater than 10% (by weight). The nickel based alloy comprises molybdenum and more than 10% tungsten (by weight), with the molybdenum and tungsten present in an amount greater than 15% (by weight). Thus, the forging head can also be guaranteed to have better toughness and hardness. The material of the forging head is mainly selected according to the additive material manufactured which is required for forging.

Figure 8:
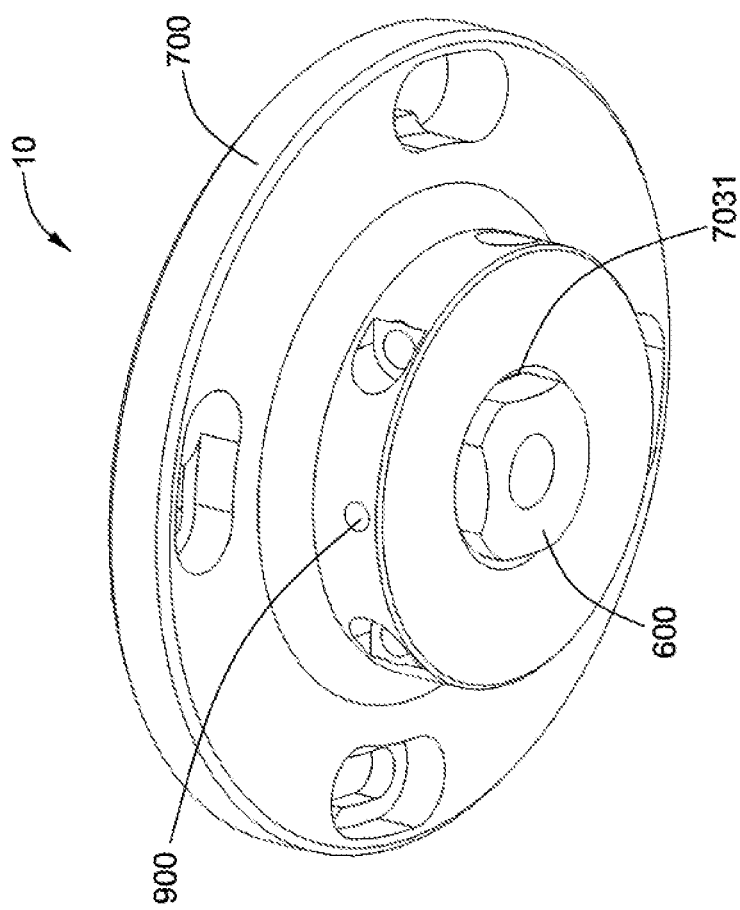
FIG. 8 is a perspective view of a forging device according to an embodiment of the present invention.

FIG. 8 shows a schematic view of a forging device 10 for additive manufacturing according to one embodiment of the present invention. The forging device of the present invention may comprise the forging head as shown in FIGS. 1-7 of the embodiments of the present invention. The forging device 10 shown in FIG. 8 comprises the forging head 600 shown in FIG. 7. The forging head 600 comprises a base portion 601, a forging portion 602 extending from one end of the base portion 601, and a through hole 603 which is formed through the base portion 601 and the forging portion 602. The forging portion 602 is configured for forging a cladding layer during formation of the cladding layer by additive manufacturing. The structure of the forging head 600 has been described in detail above and will not be described again herein.

The forging device 10 also comprises a forging head fixing device 700 for fixing the forging head. The forging head fixing device 700 comprises a cavity 703 for receiving the forging head 600. The through hole 603 of the forging head 600 and the cavity 703 of the forging head fixing device 700 communicate with each other, and are configured to allow at least one of an energy beam and an additive material to pass through during formation of the cladding layer.

Figure 9:
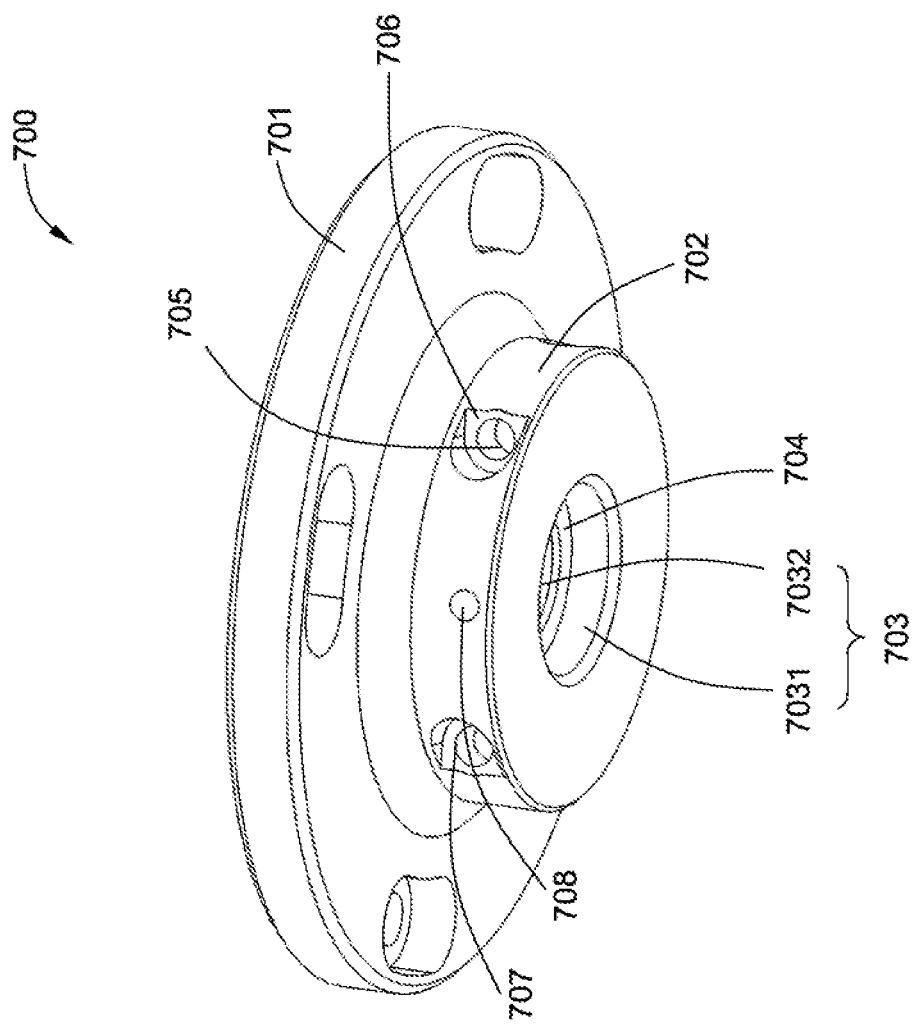
FIG. 9 is a perspective view showing the forging head fixing device of the forging device shown in FIG. 8.

Refer to FIG. 9, which shows a schematic view of a forging head fixing device 700 according to one embodiment of the present invention. The forging head fixing device 700 comprises a circular base portion 701 and a cylindrical retaining portion 702 extending from one end of the base portion 701. The cavity 703 of the forging head fixing device 700 comprises a first cavity 7032 formed through the base portion 701 and a second cavity 7031 formed through the retaining portion 702. The aperture of the first cavity 7032 is smaller than the aperture of the second cavity 7031, thus the forging head fixing device 700 further comprises a resisting portion 704 formed on the top of the second cavity 7031. When the forging head is housed in the second cavity 7031 of the forging head fixing device 700, the forging head abuts against the resisting portion 704 to prevent the forging head from shaking. The retaining portion 702 is further provided with a receiving hole 708 for receiving the fastener 900 for fixing the forging head to the forging head fixing device. The fastener 900 is held under the step portion 605 of the forging head 600 to hold the forging head 600 stable inside the forging head fixing device 700. In some embodiments, the fastener 900 can be a fixing pin or a nail.

Figure 10:
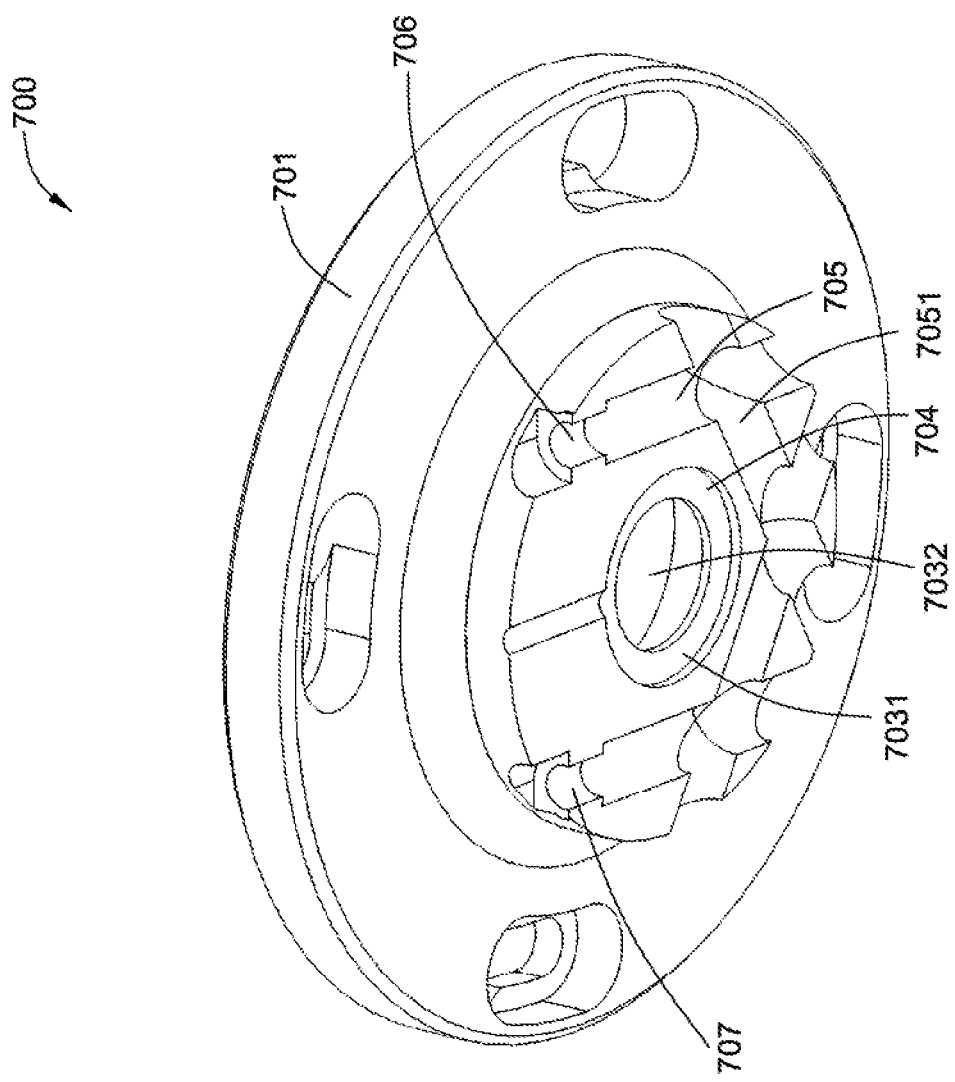
FIG. 10 is a schematic view showing the forging head fixing device in FIG. 9 after a part of its fixing portion is cut away.

By combining FIG. 9 and FIG. 10, FIG. 10 is a schematic view showing a portion of the forging head fixing device shown in FIG. 9. The retaining portion 702 is internally provided with a channel 705 for circulating a coolant to cool the forging head. FIG. 10 is a schematic view showing the structure of the inner channel 705 of the forging head fixing device 700 according to an embodiment of the present invention. The forging head fixing device 700 is configured by providing a plurality of straight channels 7051 formed through the retaining portion 702 on the cylindrical retaining portion 702. In the present embodiment, the forging head fixing device 700 is provided with four straight channels 7051, and the four straight channels 7051 are sequentially connected to form a channel 705 for circulating a coolant. Since four straight channels 7051 are to be formed, a plurality of openings are formed in the retaining portion of the forging head fixing device 700, except that the inlet 706 of the coolant and the outlet 707 of the coolant are retained, and other straight channels 7051 are formed; the openings formed during the process are sealed by brazing or other suitable sealing methods. The coolant can be circulated through the inlet 706 of the coolant and the outlet 707 of the coolant in the inner channel 705 of the retaining portion 702, thereby effectively cooling the forging head, while the service life of the forging head can also be prolonged.

Figure 11:
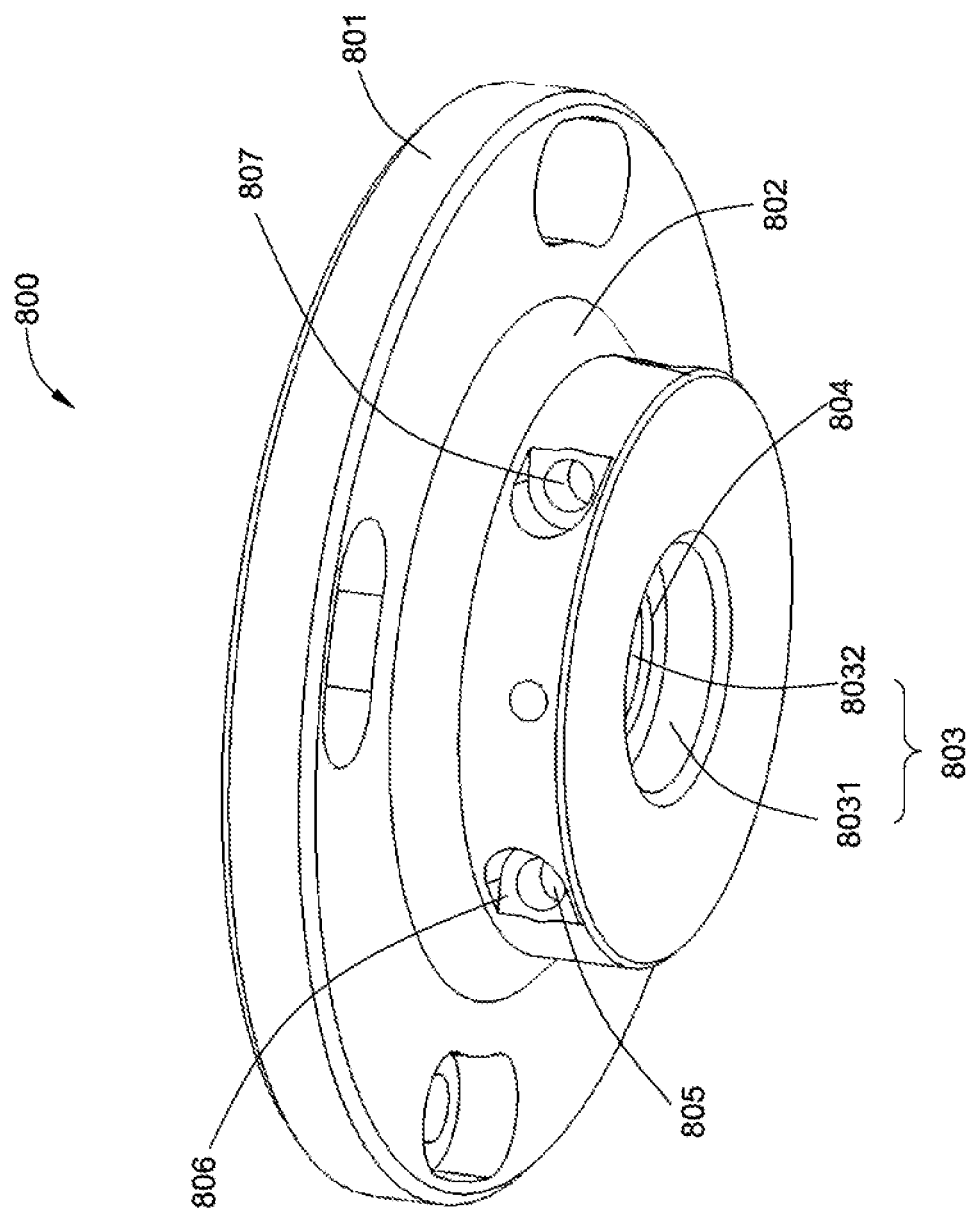
FIG. 11 is a perspective view of a forging head fixing device of a forging device according to an embodiment of the present invention.

Referring to FIG. 11, it shows a schematic view of a forging head fixing device 800 according to one embodiment of the present invention. The forging head fixing device 800 comprises a circular base portion 801 and a cylindrical retaining portion 802 extending from one end of the base portion 801. The forging head fixing device 800 also comprises a cavity 803 that houses the forging head. The cavity 803 also comprises a first cavity 8032 formed through the base 801 and a second cavity 8031 formed through the retaining portion 802. The aperture of the first cavity 8032 is smaller than the aperture of the second cavity 8031, thus the forging head fixing device 800 further comprises a resisting portion 804 formed on the top of the second cavity 8031. When the forging head is housed in the second cavity 8031 of the forging head fixing device 800, the forging head abuts against the resisting portion 804 to prevent the forging head from shaking. At the same time, the fastener is also held under the step portion of the forging head, thereby holding the forging head stable in the forging head fixing device 800.

Figure 12:
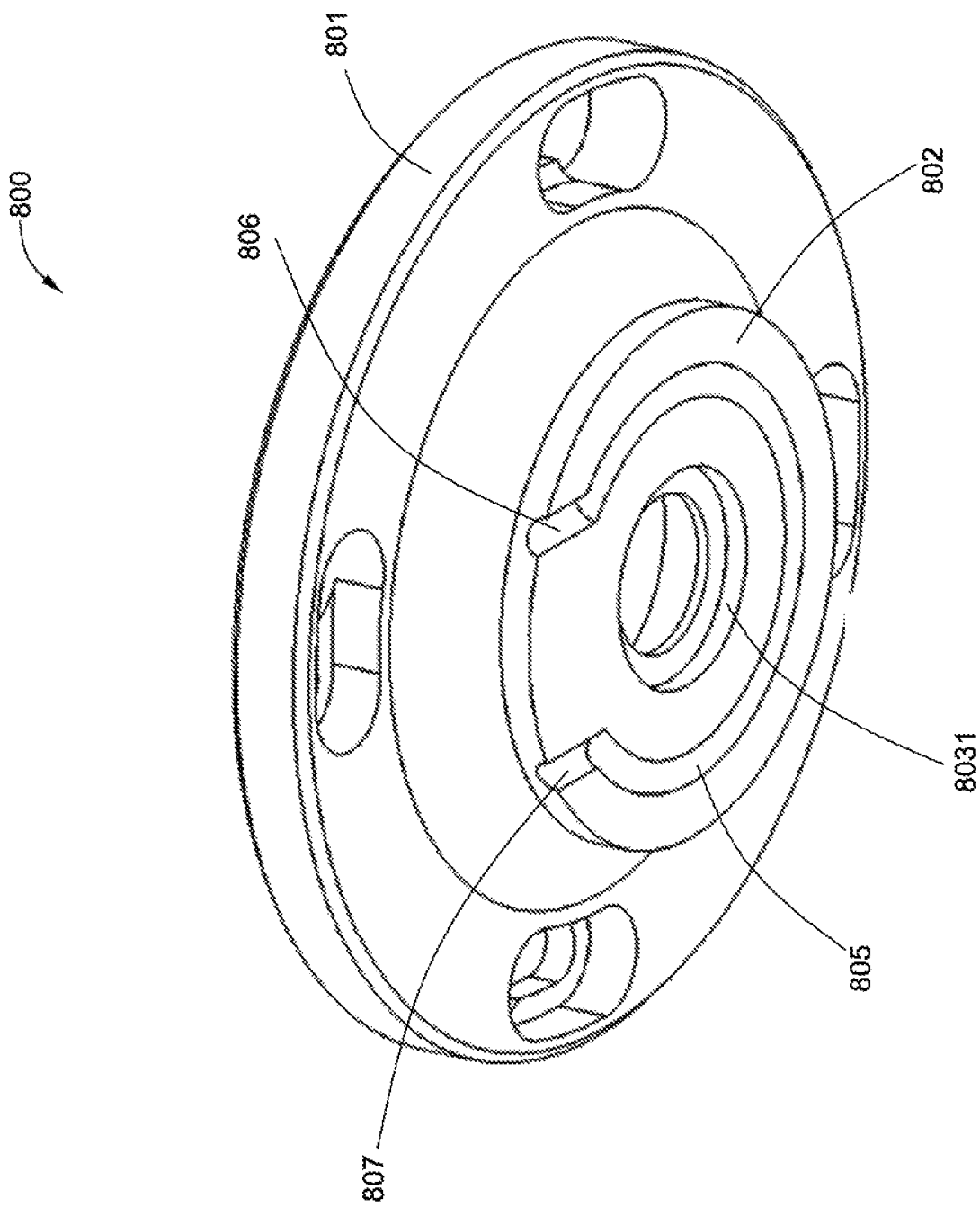
FIG. 12 is a schematic view showing the forging head fixing device in FIG. 11 after a part of its fixing portion is cut away.

By combining FIG. 11 and FIG. 12, FIG. 12 is a schematic view showing a portion of the forging head fixing device shown in FIG. 11. The retaining portion 802 is internally provided with a channel 805 for circulating a coolant to cool the forging head. FIG. 12 is a schematic view showing the structure of the inner channel 805 of the forging head fixing device 800 according to an embodiment of the present invention. The inner channel 805 is a circular channel integrally formed inside the retaining portion 802, and comprises an inlet 806 of a coolant and an outlet 807 of a coolant, such that the coolant can be cycled within the inner channel 805 of the retaining portion 802, thereby effectively cooling the forging head, while the service life of the forging head can be prolonged. The inner channel 805 of the forging head fixing device 800 shown in FIG. 12 is integrally formed inside the retaining portion 802, which simplifies the manufacturing process.

Figure 13:
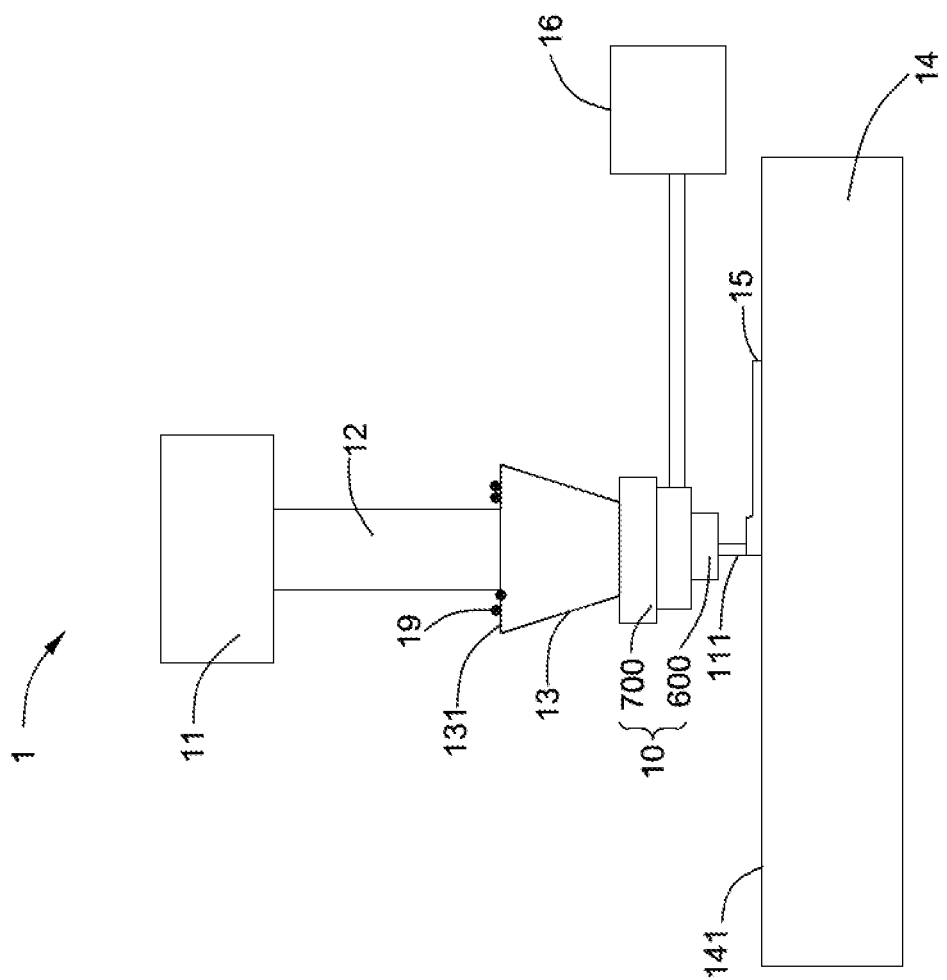
FIG. 13 is a schematic of an additive manufacturing system according to an embodiment of the present invention.

FIG. 13 shows a schematic view of an additive manufacturing system 1 according to one embodiment of the present invention. The additive manufacturing system 1 comprises an energy source device 11 and a forging device 10. The energy source device 11 comprises an energy source for emitting an energy beam 111 to the substrate 14. The forging device 10 is configured to follow the energy beam 111, thereby forming a trajectory movement of the cladding layer during the formation of the cladding layer of the energy source device 11, for real-time forging of the cladding layer.

In some embodiments, the additive manufacturing system 1 further comprises a feeding device 13 that may comprise a feed nozzle 131. Of course, the feeding device 13 may also comprise feeding mechanisms of other shapes. The feeding device 13 can add an additive material 19 to the surface 141 of the substrate 14. The feeding device 13 generally comprises a hollow structure that allows the energy beam 111 to pass through. The first energy beam 111 may be in contact with an additive material added to the surface 141 of the substrate 14, whereby the additive material may be melted on the surface 141 of the substrate 14 to form the cladding layer 15.

The additive manufacturing system 1 further comprises a coupling structure 12 disposed between the energy source device 11 and the feeding device 13, enabling the energy source device 11 and the feeding device 13 to be linked. The forging device 10 is disposed at the bottom of the feeding device 13. The forging head fixing device 700 is coupled to the feeding device, and the forging head 600 is secured under the forging head fixing device 700. Thereby, the additive material 19 can be simultaneously passed through the cavity of the forging head fixing device 700 and the through hole of the forging head, while at the same time, the energy beam 111 of the energy source device 11 can be passed through, while coaxial powder feeding and coaxial in-situ forging can be realized.

In some embodiments of the present invention, the additive material may be a powder or a filament. The additive material may be metal powder, alloy powder, super alloy powder, composite powder, metal filament, alloy filament, super alloy filament, and composite filament. The additive material may be added to the surface of the substrate by a feeding device through coaxial feeding, coaxial wire feeding, off-axis powder feeding, and off-axis wire feeding. In some embodiments of the present invention, the additive material may comprise a nickel based alloy powder.

While the energy source device 11 is emitting the first energy beam 111 on the surface of the substrate 14, the forging device 10 may simultaneously forge at least a portion of the cladding layer 15. The forging head 600 can be moved up and down in the vertical direction. In the process of forming the cladding layer 15, the forging head 600 may be in contact with the surface of the cladding layer 15, thereby hammering, peening, or pressing a portion of the cladding layer 15, thus forging the portion of the cladding layer 14.

The forging head 600 may move along a trajectory forming the cladding layer 15, which is in the same direction as the movement of the energy beam 111, for real-time forging of the cladding layer 15 during the formation of the cladding layer 15. Thus achieving peening on the cladding layer, and eliminating defects such as holes, slip planes, and micro fractures in the cladding layer 15, thereby increasing the density of the final formed part. In addition, the microstructure of the final cladding layer can also be altered, such as to promote recrystallization of the cladding layer material and formation of fine equiaxed crystal structures.

The additive manufacturing system 1 further comprises a cooling device 16 which can provide a circulating coolant to the forging head fixing device 700 and can be used to continuously cool the forging head 600 to prolong the service life of the cooling head.

The additive manufacturing system 1 of the present embodiment can realize coaxial in-situ forging in the additive manufacturing process; it can effectively improve the efficiency of the additive manufacturing system, and can also eliminate defects such as holes, slip planes and micro fractures in the cladding layer, thereby increasing the density of the final formed part.

Figure 14:
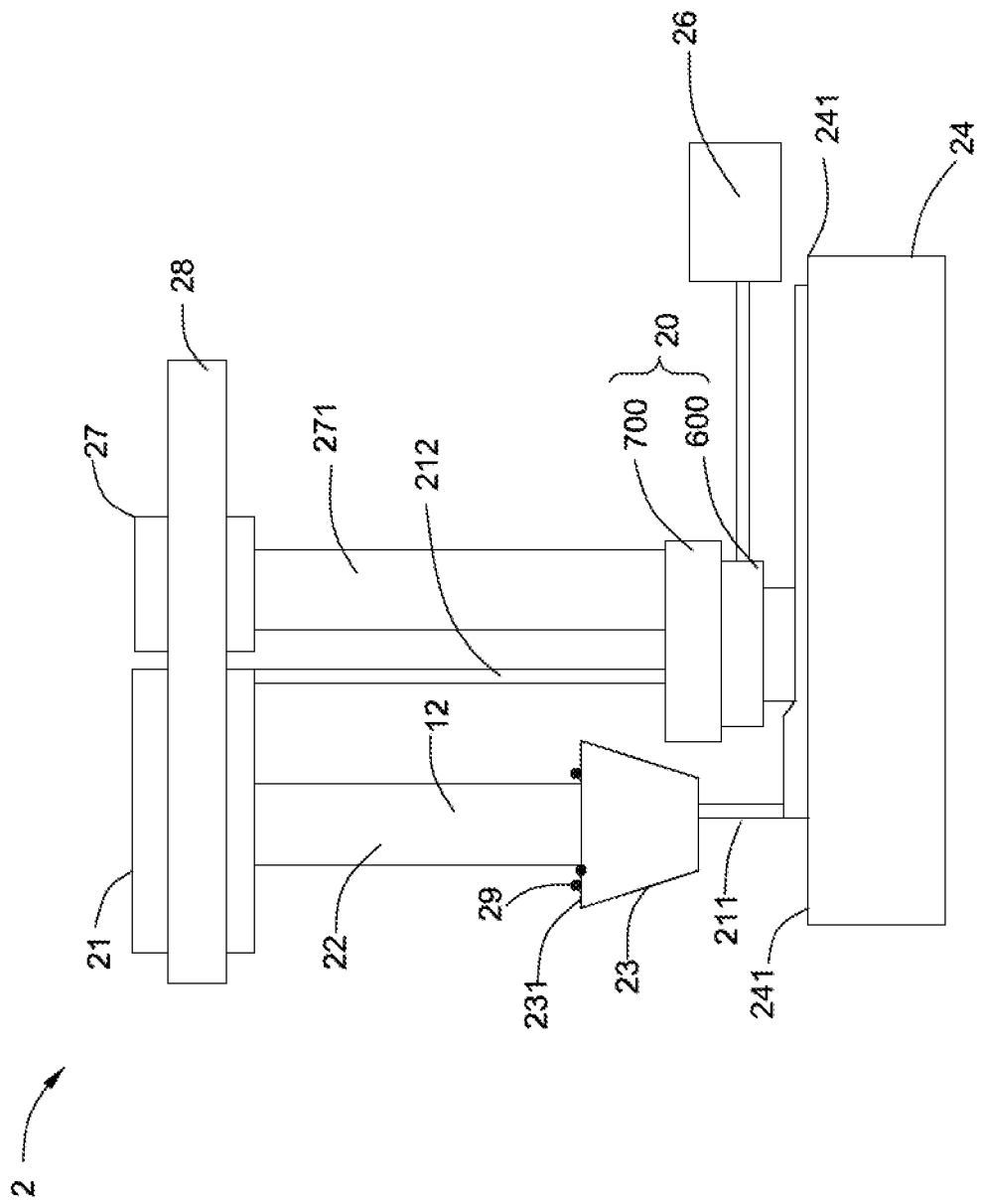
FIG. 14 is a schematic of an additive manufacturing system according to an embodiment of the present invention.

Please refer to FIG. 14, which is a schematic diagram of an additive manufacturing system 2 according to one embodiment of the present invention. The additive manufacturing system 2 comprises an energy source device 21 and a forging mechanism 27. The energy source device 21 is configured to emit a first energy beam 211 and a second energy beam 212 to the substrate 24.

The energy source device 21 can move the first energy beam 211 and the second energy beam 212 along a surface 231 of the substrate 24. In the present embodiment, the energy source device 11 comprises an energy source, while the first energy beam 211 and the second energy beam 212 are both provided by the energy source. In the present embodiment, the first energy beam 211 and the second energy beam 212 can be moved relative to the substrate 24, the substrate 24 being stationary.

In some embodiments, the energy source device is stationary. Thus, the first energy beam and the second energy beam emitted by the energy source device are also stationary. The substrate is movable relative to the first energy beam and the second energy beam along a trajectory of the first energy beam forming a cladding layer. In some embodiments, the first energy beam, the second energy beam, and the substrate can simultaneously move along a trajectory of the first energy beam forming a cladding layer. The first energy beam and the second energy beam are move relative to the substrate.

In some embodiments of the present invention, the additive manufacturing system 2 further comprises a feeding device 23. The additive manufacturing system 2 further comprises a coupling device 22 for connecting the feeding device 23 and the energy source device 21, allowing the feeding device 23 and the energy source device 21 to interlock. When the energy source device 21 is moved, the feeding device 23 also moves together. The feeding device 23 comprises a feed nozzle 231. Of course, the feeding device 23 may also comprise other forms of feeding mechanisms, such as a powder feeder, a wire feeder, and so on. The feeding device 23 can add an additive material 29 to the surface 141 of the substrate 14. The feeding device 23 generally comprises a hollow structure that allows the first energy beam 211 to pass through. The first energy beam 211 may add to the additive material 29 of the substrate 24 through melting to form the cladding layer on the surface 241 of the substrate 24.

The forging mechanism 27 comprises a fixing portion 271 and a forging device 20 connected to the fixing portion 271. The forging device 20 comprises a forging head fixing device 700 and a forging head 600 housed and secured at a lower end of the forging head fixing device 700. The second energy beam 212 emitted by the energy source 21 is adjacent to the forging device 27 and can pass through the cavity of the forging head fixing device 700 and the through hole of the forging head 600, thereby heating the cladding layer area forged by the forging head; it allows the cladding layer area forged by the forging head 60 to be always maintained within a suitable temperature range, which can reduce the damage to the forging head and prolong the service life of the forging head.

The additive manufacturing system 2 further comprises a cooling device 26, providing a circulating coolant to the forging head fixing device 700 for continuously cooling the forging head to avoid excessive temperature of the forging head used for additive manufacturing, which may be prolonged The service life of the forging head.

The additive manufacturing system 2 of the embodiment shown in FIG. 14 and the additive manufacturing system shown in FIG. 13 operate similarly, and will not be described again herein. The main difference between the additive manufacturing system 2 of the present embodiment and the additive manufacturing system 1 of FIG. 13 is that the energy source 21 can emit a first energy beam 211 and a second energy beam 212, the first energy beam 211 is used to add additive material 29 to the substrate through melting, the second energy beam 212 can pass through the cavity of the forging head fixing device of the forging device 20 and the through hole of the forging head, thereby heating the cladding layer area forged by the forging head 600 during the forging process, thus reducing the damages to the forging head. The additive manufacturing system further comprises a coupling mechanism 28 for connecting the energy source device 21 and the forging mechanism 27, to realize effect linkage between the energy source device 21 and the forging mechanism 27.

The additive manufacturing system 2 can realize real-time forging of the cladding layer by using a forging mechanism during the process of forming a cladding layer through additive manufacturing, and can eliminate defects such as holes, slip planes and micro fractures in the cladding layer, thereby increasing the density of the final formed part; at the same time, the second energy beam is also used to heat the forged cladding layer area to reduce the damage to the forging head, while the cooling device is simultaneously used to cool the forging head, thus prolonging the service life of the forging head.

The description uses specific embodiments to describe the present invention, including the best mode, and can help any person skilled in the art perform experimental operations. These operations include using any device and system and using any specific method. The patentable scope of the present invention is defined by the claims, and may include other examples that occur in the art. If the other examples are structurally different from the written language of the claims, or have a structure equivalent to that described in the claims, they are considered to be within the scope of the claims of the present invention.

What we claim is:

1. A forging device for additive manufacturing, the forging device comprising:
    a forging head comprising a base portion and a forging portion extending from the base portion, the forging portion configured for reciprocating movement up and down along a trajectory in a vertical direction to contact and forge a cladding layer during formation of the cladding layer by the additive manufacturing, the forging head further comprising a through hole extending in the vertical direction and being formed through the base portion and the forging portion; and a forging head fixing device comprising a cavity that receives the forging head, and wherein the through hole and the cavity are aligned with each other to allow at least one of an energy beam or an additive material to pass through during formation of the cladding layer.

2. The forging device of claim 1, wherein the forging head fixing device comprises a main portion and a holding portion extending downward from one end of the main portion, the cavity comprises a first cavity penetrating the main portion and a second cavity penetrating the holding portion, and the base portion is retained within the second cavity.

3. The forging device of claim 1, wherein a channel is arranged in an interior of a holding portion, for circulating a cooling liquid to cool the forging head.

4. The forging device of claim 1, wherein the forging portion comprises a substantially flat forging surface configured to contact the cladding layer.

5. The forging device of claim 1, wherein the forging portion comprises an arched forging surface configured to contact the cladding layer.

6. The forging device of claim 1, wherein the forging portion is located on one side of the through hole.

7. The forging device of claim 1, wherein the forging portion integrally extends downward from a bottom of the base portion and surrounds the through hole.

8. The forging device of claim 1, wherein a vertical cross section of the through hole is an inverted trapezoid structure.

9. The forging device of claim 1, wherein the base portion is formed with a plurality of step portions adjacent to a top end thereof.

10. The forging device of claim 1, wherein the forging head is an alloy material with a hardness greater than 30 on the Rockwell C hardness scale.

11. The forging device of claim 10, wherein the alloy material comprises a carbonized tungsten based hard alloy comprising less than 30 weight percent cobalt.

12. The forging device of claim 10, wherein the alloy material comprises a nickel based alloy comprising greater than 10 weight percent tungsten.

13. The forging device of claim 1, wherein the through hole and the cavity are configured to allow the energy beam to pass through during formation of the cladding layer.

14. The forging device of claim 1, wherein the through hole and the cavity are concentric with each other.

15. An additive manufacturing system, comprising:

an energy source configured to provide an energy beam for at least one of fusing at least a portion of a material added to a surface of a substrate for forming a cladding layer on the substrate or heating the cladding layer; and a forging device comprising a forging head configured for reciprocating movement up and down along a trajectory in a vertical direction to contact and forge the cladding layer during formation of the cladding layer by additive manufacturing; and a forging head fixing device comprising a cavity that receives the forging head, wherein the forging head comprises a base portion, a forging portion, and a through hole extending in the vertical direction formed through the base portion and the forging portion, and wherein the through hole and the cavity are aligned with each other to allow at least one of the energy beam or an additive material to pass through during formation of the cladding layer.

16. The additive manufacturing system of claim 15, wherein the forging head fixing device comprises a main portion and a holding portion extending downward from one end of the main portion, the cavity being a first cavity penetrating the main portion, the forging head fixing device further comprising a second cavity penetrating the holding portion.

17. The additive manufacturing system of claim 15, further comprising a cooling device for providing a cooling liquid to the forging head fixing device.

18. The additive manufacturing system of claim 15, wherein the forging portion comprises a substantially flat forging surface configured to contact the cladding layer.

19. The additive manufacturing system of claim 15, wherein the forging portion comprises an arched forging surface configured to contact the cladding layer.

20. The additive manufacturing system of claim 15, wherein the through hole and the cavity are concentric with each other.

* * * * *